(12) United States Patent
Zhao et al.

(10) Patent No.: US 11,774,662 B2
(45) Date of Patent: Oct. 3, 2023

(54) LIGHT GUIDING STRUCTURE, LIGHT SOURCE MODULE AND DISPLAY MODULE

(71) Applicants: BEIJING BOE OPTOELECTRONICS TECHNOLOGY CO., LTD., Beijing (CN); BOE Technology Group Co., Ltd., Beijing (CN)

(72) Inventors: Jian Zhao, Beijing (CN); Chaoyue Zhao, Beijing (CN); Xiuyun Chen, Beijing (CN); Lingyu Sun, Beijing (CN); Fei Liang, Beijing (CN); Tingxiu Hou, Beijing (CN); Peng Zhong, Beijing (CN); Jingjun Du, Beijing (CN); Yongkang Xiao, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 175 days.

(21) Appl. No.: 17/417,387

(22) PCT Filed: Sep. 21, 2020

(86) PCT No.: PCT/CN2020/116548
§ 371 (c)(1),
(2) Date: Jun. 23, 2021

(87) PCT Pub. No.: WO2022/056918
PCT Pub. Date: Mar. 24, 2022

(65) Prior Publication Data
US 2022/0326428 A1 Oct. 13, 2022

(51) Int. Cl.
*F21V 8/00* (2006.01)

(52) U.S. Cl.
CPC ......... *G02B 6/0045* (2013.01); *G02B 6/0096* (2013.01)

(58) Field of Classification Search
CPC .. G02B 6/0045; G02B 6/0096; G02B 6/0028; F21S 8/00; G02F 1/1336
See application file for complete search history.

(56) References Cited

U.S. PATENT DOCUMENTS

2011/0169026 A1* 7/2011 Tsai .................. H01L 33/58
257/98
2011/0292675 A1* 12/2011 Wang .................. G09F 13/22
362/555

(Continued)

FOREIGN PATENT DOCUMENTS

CN 101761829 A 6/2010
CN 103901526 A 7/2014

(Continued)

*Primary Examiner* — Donald L Raleigh
(74) *Attorney, Agent, or Firm* — Ling Wu; Stephen Yang; Ling and Yang Intellectual Property

(57) ABSTRACT

A light guiding structure, a light source module and a display module are disclosed. The light guiding structure includes a light guiding body and at least one light guiding cavity disposed in the light guiding body. The light guiding body includes a light incident surface and a light exit surface which are disposed opposite to each other. Each light guiding cavity includes a first end close to the light incident surface of the light guiding body and a second end away from the light incident surface of the light guiding body, and the light guiding cavity extends from the first end to the second end.

18 Claims, 9 Drawing Sheets

(56) References Cited

U.S. PATENT DOCUMENTS

| | | | | |
|---|---|---|---|---|
| 2014/0063846 A1* | 3/2014 | Lu | ........................ | G02B 6/0031 |
| | | | | 362/609 |
| 2014/0140095 A1 | 5/2014 | Yuki et al. | | |
| 2014/0185322 A1 | 7/2014 | Liao | | |
| 2014/0192558 A1* | 7/2014 | Dau | ........................ | G02B 6/00 |
| | | | | 362/613 |

FOREIGN PATENT DOCUMENTS

| | | |
|---|---|---|
| CN | 109581750 A | 4/2019 |
| CN | 210199347 U | 3/2020 |

* cited by examiner

Light guiding
body without light
guiding cavity:

Light guiding body
with light guiding
cavity:

LIGHT GUIDING STRUCTURE, LIGHT SOURCE MODULE AND DISPLAY MODULE

CROSS-REFERENCE TO RELATED APPLICATION

The present disclosure is a U.S. National Phase Entry of International Application No. PCT/CN2020/116548 having an international filing date of Sep. 21, 2020. The above-identified application is incorporated herein by reference in its entirety.

TECHNICAL FIELD

Embodiments of the present disclosure relate to, but are not limited to, the technical field of display, and particularly, to a light guiding structure, a light source module and a display module.

BACKGROUND

Currently, liquid crystal display apparatuses, such as liquid crystal televisions, notebook computers, tablet computers, and smart phones, are widely applied in social production and people's daily life. The liquid crystal display apparatuses do not emit light by themselves, but emit light from their internal light source modules.

A light source module is generally used in a side-in light source mode. However, in practical use, the uniformity of the side-in light source is poor, the light beam on a display image is obvious, and the lamp shadow is obvious, which lead to a poor display effect of a display apparatus.

SUMMARY

The following description is a summary of subject matters described in detail herein. This summary is not intended to limit the protection scope of the claims.

An embodiment of the present disclosure provides a light guiding structure, including: a light guiding body and at least one light guiding cavity disposed in the light guiding body, wherein the light guiding body includes a light incident surface and a light exit surface which are disposed opposite to each other; and each of the light guiding cavities includes a first end close to the light incident surface of the light guiding body and a second end away from the light incident surface of the light guiding body, and the light guiding cavity extends from the first end to the second end.

In an exemplary embodiment, the light guiding cavity includes a first medium layer having a refractive index less than that of the light guiding body.

In an exemplary embodiment, the first medium layer is a hollowed-out strip-shaped opening on the light guiding body.

In an exemplary embodiment, a distance between the second end of the light guiding cavity and the light incident surface of the light guiding body is 1 mm to 3 mm, and a distance between the second end of the light guiding cavity and the light exit surface of the light guiding body is 0.5 mm to 3 mm.

In an exemplary embodiment, the first medium layer is a light guiding material filled on the light guiding body.

In an exemplary embodiment, the light guiding cavity extends from the light incident surface of the light guiding body to the light exit surface of the light guiding body.

In an exemplary embodiment, there are a plurality of light guiding cavities which are divided into a plurality of groups of light guiding cavities, wherein each group of light guiding cavities includes a central plane located in the light guiding body, and the group of light guiding cavities includes n first light guiding cavities located on one side of the central plane and n second light guiding cavities located on the other side of the central plane, where n is a natural number greater than or equal to 1; a distance between a first end of a first light guiding cavity and a corresponding central plane is less than a distance between a second end of the first light guiding cavity and the corresponding central plane; and a distance between a first end of a second light guiding cavity and a corresponding central plane is less than a distance between a second end of the second light guiding cavity and the corresponding central plane; and the central plane is a virtual plane perpendicular to the light incident surface in the light guiding body.

In an exemplary embodiment, an $i^{th}$ first light guiding cavity and an $i^{th}$ second light guiding cavity are disposed in a mirror manner with respect to a central plane of each group of light guiding cavities, where i is a natural number greater than or equal to 1 and less than or equal to n.

In an exemplary embodiment, the first light guiding cavity includes a first portion close to the light incident surface of the light guiding body and a second portion away from the light incident surface of the light guiding body, and cross-sectional shapes of the first portion and the second portion along a plane perpendicular to the light exit surface of the light guiding body include any of the followings:

the cross-sectional shape of the first portion is a curved strip shape, and the cross-sectional shape of the second portion is a curved strip shape;

the cross-sectional shape of the first portion is a curved strip shape, and the cross-sectional shape of the second portion is a folded strip shape;

the cross-sectional shape of the first portion is a curved strip shape, and the cross-sectional shape of the second portion is a straight strip shape;

the cross-sectional shape of the first portion is a folded strip shape, and the cross-sectional shape of the second portion is a curved strip shape; and the cross-sectional shape of the first portion is a straight strip shape, and the cross-sectional shape of the second portion is a curved strip shape.

In an exemplary embodiment, the first portion is bent in a direction towards the central plane of the light guiding cavities and the second portion is bent in a direction away from the central plane of the light guiding cavities along a plane perpendicular to the light exit surface of the light guiding body.

In an exemplary embodiment, the first portion has a width of 0.2 mm to 1.5 mm, the first portion has a depth of 1 mm to 2 mm, the first portion has a curvature radius of 2 mm to 4.5 mm, and an angle between the first portion and the light incident surface of the light guiding body is 40° to 60° along the plane perpendicular to the light exit surface or the light incident surface of the light guiding body at a junction between the first portion and the light incident surface of the light guiding body; and the second portion has a width of 0.2 mm to 1.5 mm, the second portion has a depth of 1 mm to 2 mm, the second portion has a curvature radius of 3.5 mm to 4.5 mm, and an angle between the second portion and the light incident surface of the light guiding body is 40° to 60° along the plane perpendicular to the light exit surface or the light incident surface of the light guiding body at a junction between the second portion and the first portion.

In an exemplary embodiment, a distance between two adjacent first light guiding cavities from a group of light guiding cavities is 0.2 mm to 1 mm.

In an exemplary embodiment, the first light guiding cavity includes a fifth portion disposed between the light incident surface and the light exit surface of the light guiding body, and all fifth portions are bent in a direction away from the central plane of the light guiding cavities.

In an exemplary embodiment, each fifth portion has a width of 0.3 mm to 1.5 mm, each fifth portion has a depth which is the same as that of the light guiding structure, each fifth portion has a curvature radius of 2 mm to 5 mm, and an angle between the fifth portion and the light incident surface of the light guiding body is 40° to 60° along a plane perpendicular to the light exit surface or the light incident surface of the light guiding body at a junction between the fifth portion and the light incident surface of the light guiding body.

In an exemplary embodiment, a distance between two adjacent fifth portions from a group of light guiding cavities along an extending direction of the light incident surface of the light guiding body is 0.2 mm to 1 mm.

In an exemplary embodiment, at least one of the plurality of light guiding cavities includes a plurality of sub-light guiding cavities which are disposed at a second end of the light guiding cavity; the sub-light guiding cavity includes a first end close to the light incident surface of the light guiding body and a second end away from the light incident surface of the light guiding body, and the second end of the sub-light guiding cavity includes a second central plane located in the light guiding body, which is a virtual plane perpendicular to the light incident surface in the light guiding body; a distance between the first end of the sub-light guiding cavity and the second central plane is less than a distance between the second end of the sub-light guiding cavity and the second central plane; and the plurality of light guiding cavities and sub-light guiding cavities form a tree structure.

In an exemplary embodiment, the light guiding structure further includes a first flat surface connected to the light exit surface and the light incident surface respectively, a second flat surface connected to the light exit surface and the light incident surface respectively, a first side surface connected to the light exit surface and the light incident surface respectively, and a second side surface connected to the light exit surface and the light incident surface respectively, wherein the first side surface is disposed opposite to the second side surface, the first flat surface is disposed opposite to the second flat surface, and the first side surface, the second side surface, the first flat surface, and the second flat surface are all provided with reflective sheets.

An embodiment of the present disclosure further provides a light source module, which includes any light guiding structure described above and further includes at least one light emitting diode having a light exit surface disposed towards the light incident surface of the light guiding body.

An embodiment of the present disclosure further provides a display module including the light source module described above and a display panel.

In an exemplary embodiment, the display module is a reflective liquid crystal display module or a transparent liquid crystal display module.

Other aspects will become apparent upon reading and understanding the brief description of the drawings and embodiments of the present disclosure.

DETAILED DESCRIPTION

Implementation of embodiments of the present disclosure will be further described in detail below with reference to the accompanying drawings. The following description is used for explaining the embodiments of the present disclosure, but is not intended to limit the scope of the embodiments of the present disclosure. It should be illustrated that embodiments in the present disclosure and features in the embodiments may be combined with each other randomly if there is no conflict.

The embodiments of the present disclosure provide a light guiding structure. In an exemplary embodiment, the light guiding structure includes a light guiding body and at least one light guiding cavity disposed in the light guiding body, wherein the light guiding body includes a light incident surface and a light exit surface which are disposed opposite to each other; and each of the light guiding cavities includes a first end close to the light incident surface of the light guiding body and a second end away from the light incident surface of the light guiding body, and the light guiding cavity extends from the first end to the second end. The light guiding structure according to the embodiment of the present disclosure may achieve an area light source with high uniformity under a condition of ultra-short light mixing distance.

According to an embodiment of the present disclosure, a number of light guiding cavities in each light guiding structure may be set according to an actual size of the light guiding structure and an interval between the light guiding cavities, and the number of the light guiding cavities in each light guiding structure may be one or more.

In an exemplary embodiment, the light guiding cavity includes a first medium layer, which has a refractive index less than that of the light guiding body.

Figure 1:
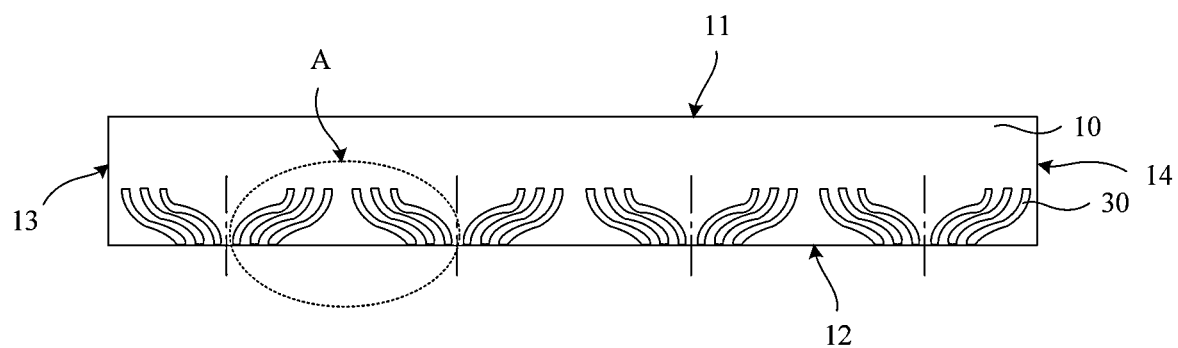
FIG. 1 is a schematic structural sectional view of a light guiding structure along a plane perpendicular to a light exit surface according to an embodiment of the present disclosure.
Figure 2:
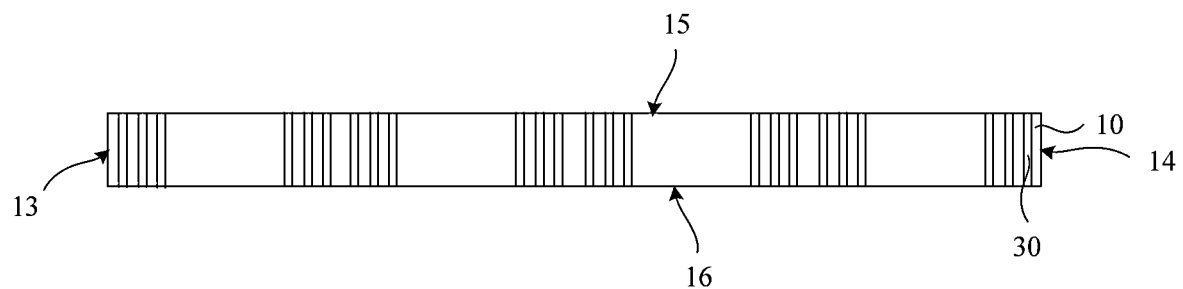
FIG. 2 is a schematic structural sectional view of the light guiding structure shown in FIG. 1 along a plane parallel to the light exit surface.

FIG. 1 is a schematic structural sectional view of a light guiding structure along a plane perpendicular to a light exit surface according to an embodiment of the present disclosure; and FIG. 2 is a schematic structural sectional view of the light guiding structure shown in FIG. 1 along a plane parallel to the light exit surface. As shown in FIGS. 1 and 2, the light guiding structure 10 includes a light guiding body and at least one light guiding cavity disposed in the light guiding body, wherein the light guiding body includes a light exit surface 11 and a light incident surface 12 which are disposed opposite to each other, a first surface 15 connected to the light exit surface 11 and the light incident surface 12 respectively, and a second surface 16 connected to the light exit surface 11 and the light incident surface 12 respectively; the first surface 15 and the second surface 16 are disposed opposite to each other. Further, as shown in FIG. 1, the light guiding structure may further include a first side surface 13 connected to the light exit surface 11 and the light incident surface 12 respectively, and a second side surface 14 connected to the light exit surface 11 and the light incident surface 12 respectively, wherein the first side surface 13 and the second side surface 14 are disposed opposite to each other. The light exit surface 11, the light incident surface 12, the first side surface 13 and the second side surface 14 may be flat surfaces or curved surfaces, which may be set according to specific requirements. Flat surfaces are taken as an example in FIG. 1. In an exemplary embodiment, the light exit surface 11 and the light incident surface 12 may be disposed to be parallel to each other or may be disposed not to be parallel to each other, so as to satisfy use requirements in different light source environments.

In an exemplary embodiment, the light exit surface 11 and the light incident surface 12 may be subjected to atomization treatment, patterning treatment, or texturing treatment, etc., to increase the light exit efficiency of the light guiding structure 10 and the uniformity of the emitted light rays.

Figure 3:
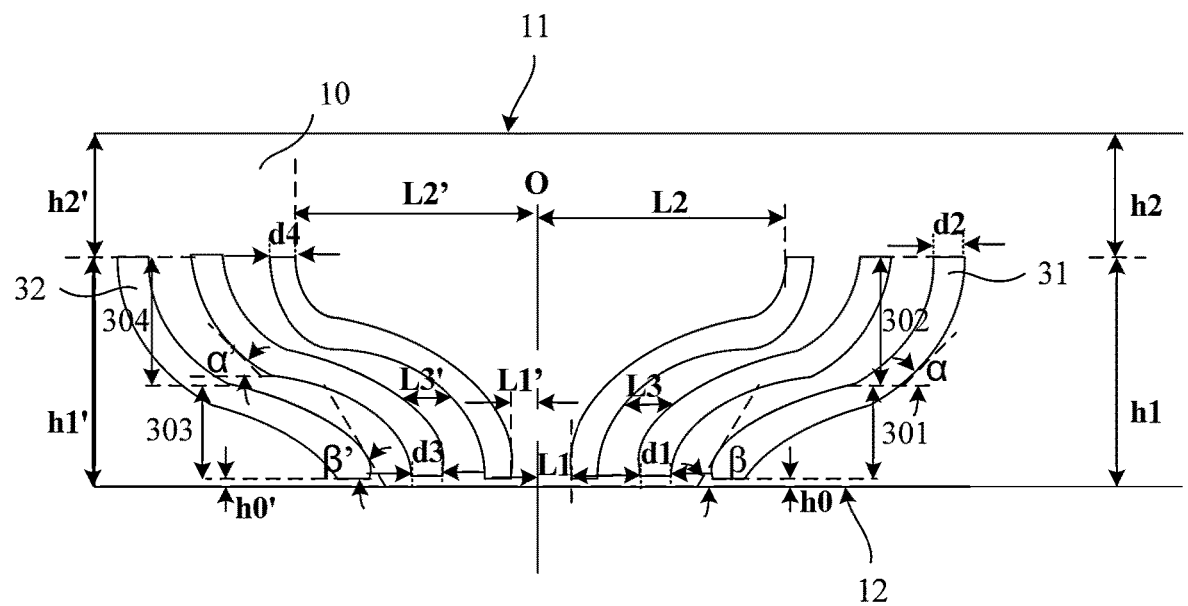
FIG. 3 is a schematic structural sectional view of a group of light guiding cavities in FIG. 1.

In an exemplary embodiment, there may be a plurality of light guiding cavities 30, which may be divided into a plurality of groups of light guiding cavities 30. FIG. 3 is a schematic structural diagram of a group of light guiding cavities according to an exemplary embodiment of the present disclosure. As shown in FIG. 1 and FIG. 3, each group of light guiding cavities 30 includes a central plane O located in the light guiding body; and each group of light guiding cavities 30 includes n first light guiding cavities 31 on one side of the central plane O and n second light guiding cavities 32 on the other side of the central plane O, where n is a natural number greater than or equal to 1.

In this embodiment, the central plane O is a virtual plane perpendicular to the light incident surface 12 in the light guiding body. At least two light guiding cavities 30 in each group of light guiding cavities 30 are disposed along an extending direction of the light incident surface 12, and the virtual central plane O is perpendicular to the light incident surface 12 and is located between the at least two light guiding cavities 30. The extending direction of the light incident surface 12 of the light guiding body is a horizontal direction in FIG. 1.

In an exemplary embodiment, a distance L1 between a first end of a first light guiding cavity 31 and a corresponding central plane O is less than a distance L2 between a second end of the first light guiding cavity 31 and the corresponding central plane O; and a distance L1' between a first end of a second light guiding cavity 32 and the corresponding central plane O is less than a distance L2' between a second end of the second light guiding cavity 32 and the corresponding central plane O.

In an exemplary embodiment, a cross-sectional shape of the light guiding cavity 30 along a plane perpendicular to the light exit surface 11 or the light incident surface 12 includes any one or more of a curved strip shape, a folded strip shape or other strip-shaped structures.

In an exemplary embodiment, a cross-sectional shape of the light guiding cavity 30 along a plane parallel to the light exit surface 11 or the light incident surface 12 may include any one or more of circular, elliptical, triangular, trapezoidal, rectangular or other arbitrary shapes.

In an exemplary embodiment, an $i^{th}$ first light guiding cavity 31 and an $i^{th}$ second light guiding cavity 32 are disposed in a mirror manner with respect to a central plane O of each group of light guiding cavities 30, where i is a natural number greater than or equal to 1 and less than or equal to n, and n is a natural number greater than or equal to 1. For example, the first light guiding cavity is S-shaped and the second light guiding cavity is inverse S-shaped, or the first light guiding cavity is inverse S-shaped and the second light guiding cavity is S-shaped.

In an exemplary embodiment, as shown in FIG. 3, the $i^{th}$ first light guiding cavity 31 includes a first portion 301 close to the light incident surface 12 of the light guiding body and a second portion 302 away from the light incident surface 12 of the light guiding body. First portions 301 of different first light guiding cavities 31 may have the same or different shapes, and second portions 302 of the different first light guiding cavities 31 may have the same or different shapes.

In an exemplary embodiment, cross-sectional shapes of the first portion 301 and the second portion 302 along the plane perpendicular to the light exit surface 11 or the light incident surface 12 of the light guiding body include any of the followings:

the cross-sectional shape of the first portion 301 is a curved strip shape, and the cross-sectional shape of the second portion 302 is a curved strip shape;

the cross-sectional shape of the first portion 301 is a curved strip shape, and the cross-sectional shape of the second portion 302 is a folded strip shape;

the cross-sectional shape of the first portion 301 is a curved strip shape, and the cross-sectional shape of the second portion 302 is a straight strip shape;

the cross-sectional shape of the first portion 301 is a folded strip shape, and the cross-sectional shape of the second portion 302 is a curved strip shape; and the cross-sectional shape of the first portion 301 is a straight strip shape, and the cross-sectional shape of the second portion 302 is a curved strip shape.

In an exemplary embodiment, the first portion 301 is bent in a direction towards the central plane O of the light guiding cavities 30, and the second portion 302 is bent in a direction away from the central plane O of the light guiding cavities 30 along the plane perpendicular to the light exit surface 11 or the light incident surface 12 of the light guiding body.

In an exemplary embodiment, as shown in FIG. 3, the first portion 301 has a width d1 of 0.2 mm to 1.5 mm, the first portion 301 has a depth of 1 mm to 2 mm, the first portion 301 has a curvature radius of 2 mm to 4.5 mm, and an angle β between the first portion 301 and the light incident surface 12 may be about 40° to 60° along the plane perpendicular to the light exit surface 11 or the light incident surface 12 of the light guiding body at a junction between the first portion 301 and the light incident surface 12. In the embodiment of the present disclosure, the width refers to a characteristic dimension in a direction parallel to the light exit surface 11 of the light guiding body, and the depth refers to a characteristic dimension in an extending direction from the light incident surface 12 of the light guiding body to the light exit surface 11 of the light guiding body. For example, when the light incident surface 12 of the light guiding body is parallel to the light exit surface 11 of the light guiding body, the extending direction from the light incident surface 12 of the light guiding body to the light exit surface 11 of the light guiding body may be a direction perpendicular to the light incident surface 12 of the light guiding body.

In an exemplary embodiment, as shown in FIG. 3, the second portion 302 has a width d2 of 0.2 mm to 1.5 mm, the second portion 302 has a depth of 1 mm to 2 mm, the second portion 302 has a curvature radius of 3.5 mm to 4.5 mm, and an angle α between the second portion 302 and the light incident surface 12 may be about 40° to 60° along the plane perpendicular to the light exit surface 11 or the light incident surface 12 of the light guiding body at a junction between the second portion 302 and the first portion 301.

In this embodiment, parameters of the first portions 301 of the plurality of first light guiding cavities may be the same or different, and parameters of the second portions 302 of the plurality of first light guiding cavities may be the same or different.

In an exemplary embodiment, a depth h0 between the first end of the first light guiding cavity 31 and the light incident surface 12 of the light guiding body may be 0 mm to 0.05 mm. For example, there may be a gap of 0 mm between the first end of the first light guiding cavity 31 and the light incident surface 12 of the light guiding body. At this time, light rays entering the light guiding structure 10 are all transmitted to the light exit surface 11 of the light guiding body under the action of the light guiding cavity without leaking from the side of the light guiding body.

In an exemplary embodiment, a depth between the second end of the first light guiding cavity 31 and the light incident surface 12 of the light guiding body is h1, a depth between the second end of the first light guiding cavity 31 and the light exit surface 11 of the light guiding body is h2, a distance between the light incident surface 12 of the light guiding body and the light exit surface 11 of the light guiding body is h1+h2, wherein a ratio of h1 to h1+h2 may be between 0.5 and 0.8.

In an exemplary embodiment, the depth h1 between the second end of the first light guiding cavity 31 and the light incident surface 12 of the light guiding body may be 1 mm to 3 mm, and the depth h2 between the second end of the first light guiding cavity 31 and the light exit surface 11 of the light guiding body may be 0.5 mm to 3 mm.

In an exemplary embodiment, a distance L3 between two adjacent first light guiding cavities 31 from a group of light guiding cavities along the extending direction of the light incident surface 12 of the light guiding body may be 0.2 mm to 1 mm.

In an exemplary embodiment, as shown in FIG. 3, an $i^{th}$ second light guiding cavity 32 includes a third portion 303 close to the light incident surface 12 of the light guiding body and a fourth portion 304 away from the light incident surface 12 of the light guiding body. Third portions 303 of different second light guiding cavities 32 may have the same or different shapes, and fourth portions 304 of the different second light guiding cavities 32 may have the same or different shapes.

In an exemplary embodiment, cross-sectional shapes of the third portion 303 and the fourth portion 304 along the plane perpendicular to the light exit surface 11 or the light incident surface 12 include any of the followings:

the cross-sectional shape of the third portion 303 is a curved strip shape, and the cross-sectional shape of the fourth portion 304 is a curved strip shape;

the cross-sectional shape of the third portion 303 is a curved strip shape, and the cross-sectional shape of the fourth portion 304 is a folded strip shape;

the cross-sectional shape of the third portion 303 is a curved strip shape, and the cross-sectional shape of the fourth portion 304 is a straight strip shape;

the cross-sectional shape of the third portion 303 is a folded strip shape, and the cross-sectional shape of the fourth portion 304 is a curved strip shape; and the cross-sectional shape of the third portion 303 is a straight strip shape, and the cross-sectional shape of the fourth portion 304 is a curved strip shape.

In an exemplary embodiment, the third portion 303 is bent in the direction towards the central plane O of the light guiding cavities 30 and the fourth portion 304 is bent in the direction away from the central plane O of the light guiding cavities 30 along the plane perpendicular to the light exit surface 11 or the light incident surface 12.

In an exemplary embodiment, as shown in FIG. 3, the third portion 303 has a width d3 of 0.2 mm to 1.5 mm, the third portion 303 has a depth of 1 mm to 2 mm, the third portion 301 has a curvature radius of 2 mm to 4.5 mm, and an angle β' between the third portion 303 and the light incident surface 12 may be about 40° to 60° along the plane perpendicular to the light exit surface 11 or the light incident surface 12 of the light guiding body at a junction between the third portion 303 and the light incident surface 12.

In an exemplary embodiment, as shown in FIG. 3, the fourth portion 304 has a width d4 of 0.2 mm to 1.5 mm, the fourth portion 304 has a depth of 1 mm to 2 mm, the fourth portion 304 has a curvature radius of 3.5 mm to 4.5 mm, and an angle α' between the fourth portion 304 and the light incident surface 12 may be about 40° to 60° along the plane perpendicular to the light exit surface 11 or the light incident surface 12 of the light guiding body at a junction between the fourth portion 304 and the third portion 303.

In this embodiment, parameters of the third portions 303 of the plurality of second light guiding cavities 32 may be the same or different, and parameters of the fourth portions 304 of the plurality of second light guiding cavities 32 may be the same or different.

In an exemplary embodiment, the depth h0' between the first end of the second light guiding cavity 32 and the light incident surface 12 of the light guiding body may be 0 mm to 0.05 mm. For example, there may be a gap of 0 mm between the first end of the second light guiding cavity 32 and the light incident surface 12 of the light guiding body.

In an exemplary embodiment, the depth between the second end of the second light guiding cavity 32 and the light incident surface 12 of the light guiding body is h1', the depth between the second end of the second light guiding cavity 32 and the light exit surface 11 of the light guiding body is h2', and the distance between the light incident surface 12 of the light guiding body and the light exit surface 11 of the light guiding body is h1'+h2', wherein a ratio of h1' to h1'+h2' may be between 0.5 and 0.8.

In an exemplary embodiment, the depth h1' between the second end of the second light guiding cavity 32 and the light incident surface 12 of the light guiding body may be 1 mm to 3 mm, and the depth h2' between the second end of the second light guiding cavity 32 and the light exit surface 11 of the light guiding body may be 0.5 mm to 3 mm.

In an exemplary embodiment, a distance L3' between two adjacent second light guiding cavities 32 from a group of light guiding cavities along the extending direction of the light incident surface 12 of the light guiding body may be 0.2 mm to 1 mm.

In an exemplary embodiment, the light guiding cavity 30 includes a first medium layer having a refractive index less than that of the light guiding body.

In an exemplary embodiment, the first medium layer is a hollowed-out strip-shaped opening on the light guiding body.

In this embodiment, a first medium in the first medium layer is air, and the first medium in the first medium layer is in direct contact with the light guiding body. The light guiding cavity 30 may be processed by secondary machining, and a corresponding strip-shaped opening may be cut in the light guiding body by secondary wire cutting, which has high machining efficiency and low cost.

In this embodiment, a first end face and a second end face of the light guiding cavity 30 may not be flush with the light incident surface 12 and the light exit surface 11 of the light guiding body at the same time, so as to ensure the integrity of the light guiding structure 10.

In an exemplary embodiment, the light guiding cavity 30 is filled with a light guiding material having a first refractive index less than a refractive index of the light guiding body. At this time, the first medium in the first medium layer is a light guiding material having the first refractive index, and the first medium in the first medium layer is in direct contact with the light guiding body.

In an exemplary embodiment, a material of the light guiding body may be polycarbonate resin (PC) or polymethylmethacrylate (PMMA), etc. The light guiding material having the first refractive index may be light guiding resin having a refractive index less than that of PC or PMMA or other materials having a low refractive index.

In this embodiment, the light guiding cavity 30 may be processed by injection molding, and the light guiding cavity 30 is filled with materials having a low refractive index, such as light guiding resin. In this embodiment, the first end face and the second end face of the light guiding cavity 30 may be flush with the light incident surface 12 and the light exit surface 11 of the light guiding body at the same time.

Figure 4:
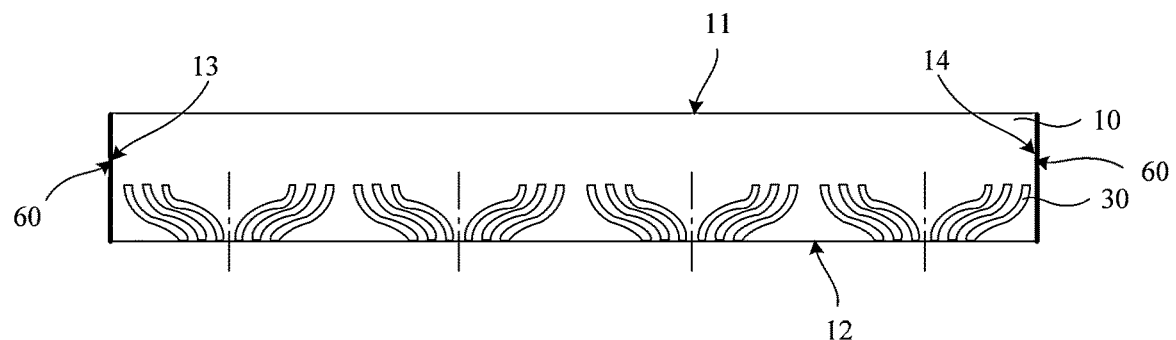
FIG. 4 is a schematic structural sectional view of another light guiding structure according to an embodiment of the present disclosure.

In an exemplary embodiment, as shown in FIG. 4, the first side surface 13, the second side surface 14, the first flat surface 15 (not shown in FIG. 4) and the second flat surface 16 (not shown in FIG. 4) of the light guiding structure 10 all have reflective sheets 60 disposed thereon. Light rays emitted from the first side surface 13, the second side surface 14, the first flat surface 15 and the second flat surface 16 of the light guiding structure 10 are reflected back into the light guiding structure 10 by the reflective sheets 60, so as to avoid leakage of light rays from the first side surface 13, the second side surface 14, the first flat surface 15 and the second flat surface 16 of the light guide structure 10, thereby further improving the light guiding efficiency.

Figure 5:
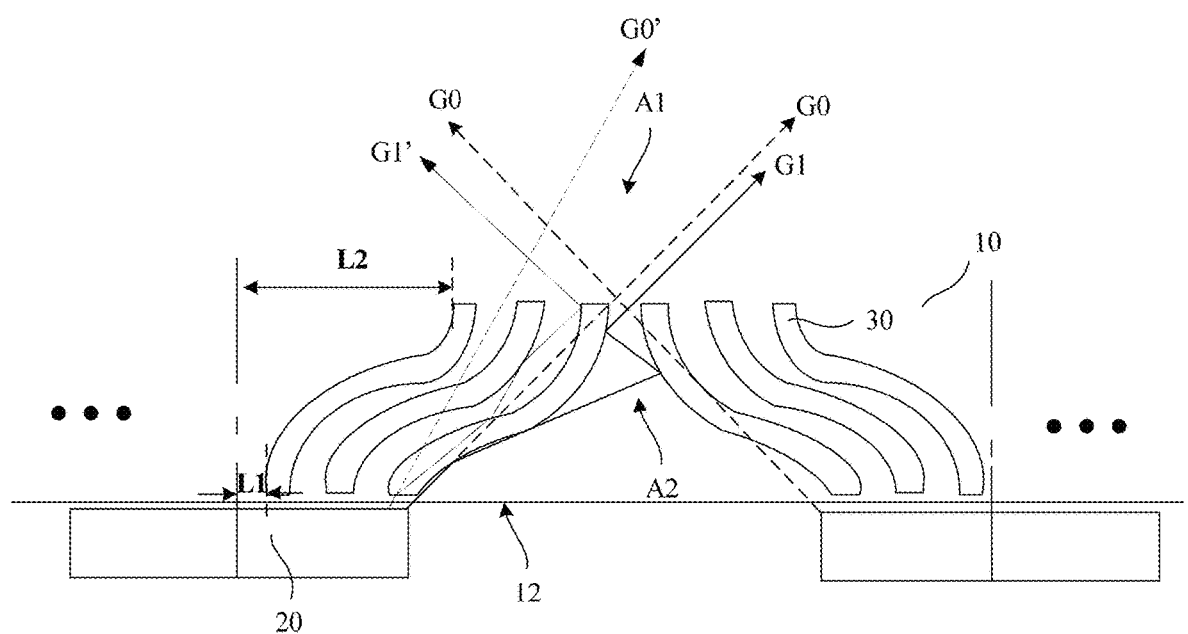
FIG. 5 is a schematic diagram of a light transmission path of the light guiding structure shown in FIG. 1.
Figure 6:
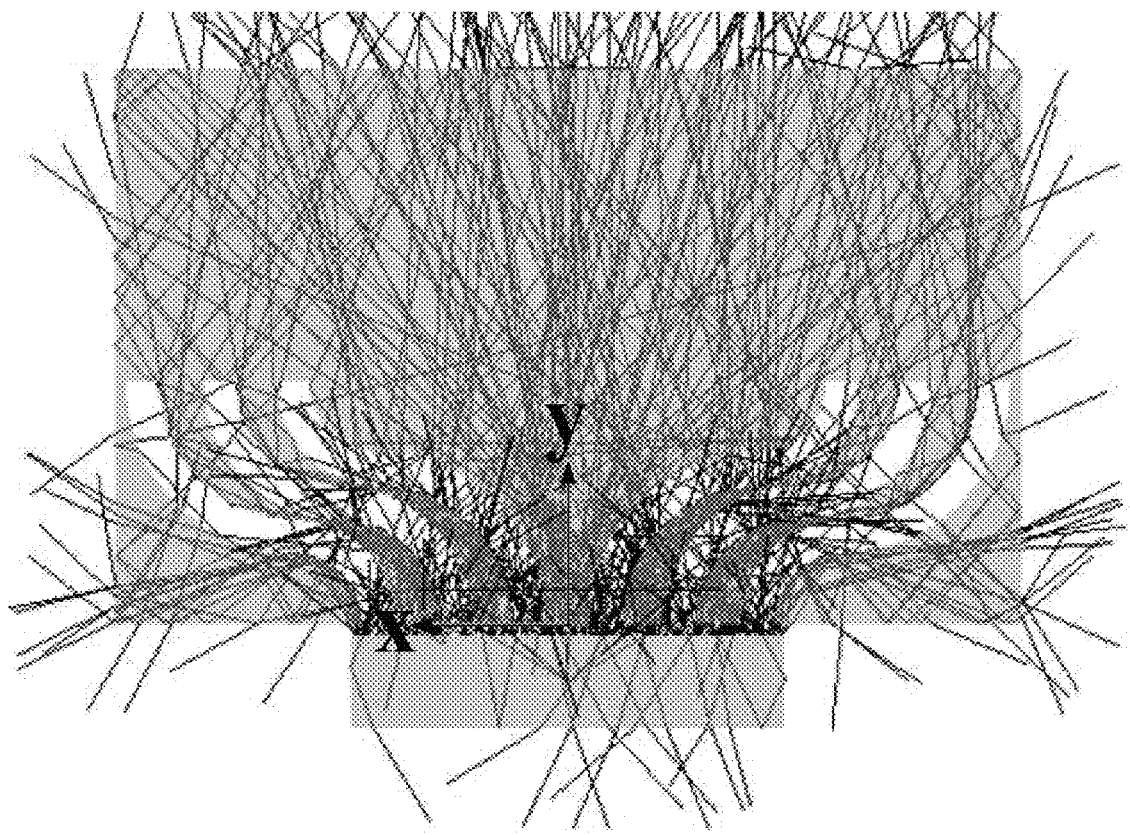
FIG. 6 is a schematic diagram of a simulation effect of light rays of the light guiding structure shown in FIG. 1.
Figures 7, 8:
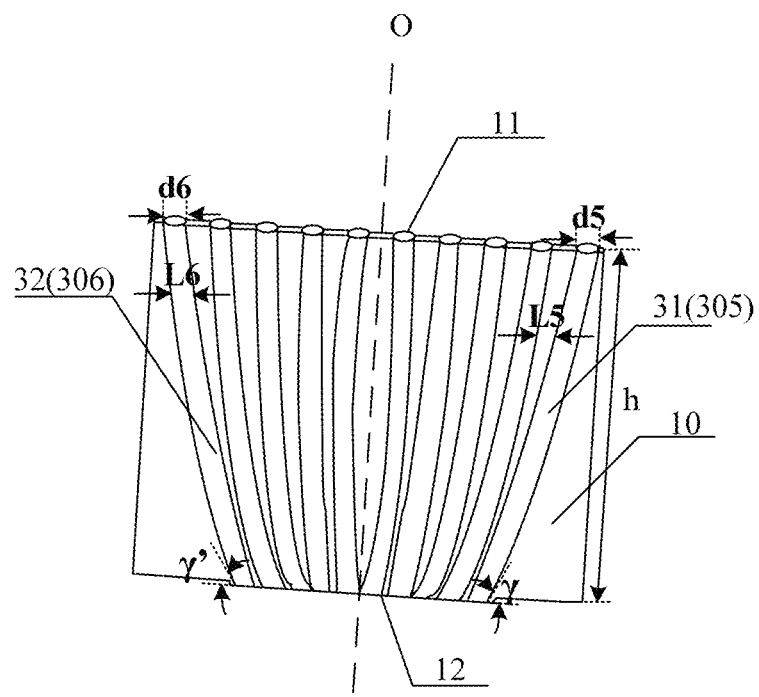
FIG. 7 is a schematic diagram illustrating an effect of comparison between uniformity of the light exit surface when the light guiding body shown in FIG. 1 does not have a light guiding cavity and uniformity of the light exit surface when the light guiding body shown in FIG. 1 has a light guiding cavity.
FIG. 8 is a schematic structural sectional view of another light guiding structure according to an embodiment of the present disclosure.

FIG. 5 is a schematic diagram of a light transmission path of a light guiding cavity 30 according to an exemplary embodiment of the present disclosure, and the light guiding cavity 30 in FIG. 5 is an enlarged view of the light guiding cavity 30 in an area A in FIG. 1. When the light guiding cavity 30 is not disposed in the light guiding structure 10, light rays emitted from two adjacent light emitting diodes 20 enter the light guiding structure 10 and then propagate in a straight line. As shown by dashed lines G0 and G0' in FIG. 5, the light rays G0 propagating in a straight line form a bright area in an area A1 between the adjacent light emitting diodes 20, and form a dark area in an area A2 between the adjacent light emitting diodes 20, wherein the areas A1 and A2 are located in a middle area between the two light emitting diodes 20. According to an embodiment of the present disclosure, the light guiding cavities 30 are disposed in the light guiding structure 10, so that after the light rays emitted from the two adjacent light emitting diodes 20 enter the light guiding structure 10, as shown by solid lines G1 and G1' in FIG. 5, the light rays G1 are totally reflected by a surface of the light guiding cavity 30 when the light rays G1 are incident on the surface of the light guiding cavity 30, so that the reflected light rays G1 are deflected towards the middle area between the two light emitting diodes 20, which increases an amount of light rays in the area A2 and reduces an amount of light rays in the area A1. In this way, the formation of the dark area in the area A2 and the formation of the bright area in the area A1 are avoided, or a brightness difference between the areas A1 and A2 area and other visible areas is reduced. After the light rays G1' enter the light guiding cavity 30, the light rays G1' are firstly refracted by the surface of the light guiding cavity 30, and the refracted light rays G1' are totally reflected by the surface of the light guiding cavity 30 and are deflected in the direction away from the area A1, thereby further reducing the amount of light rays in the area A1. FIG. 6 is a schematic diagram of a simulation effect of actual light rays of the light guiding cavity shown in FIG. 1, and FIG. 7 is a schematic diagram illustrating an effect of comparison between uniformity of the light exit surface when the light guiding body shown in FIG. 1 does not have a light guiding cavity 30 and uniformity of the light exit surface when the light guiding body shown in FIG. 1 has a light guiding cavity 30. Simulation results show that under the condition of a single lamp, the optical uniformity of the light exit surface 11 of the light guiding body including the light guiding cavity 30 in FIG. 1 may reach more than 85%.

As shown in FIG. 4 and FIG. 5, the light guiding cavities 30 are set to have an S-shaped structure, so that it may be easy to selectively control an amount of incident light rays and a direction and an angle of emitted light rays by adjusting sizes, directions and angles of an S-shaped entrance and an S-shaped exit, thereby guiding the light rays from the bright area to the dark area, and playing a certain role in shielding and converging the angle of the emitted light rays. In this way, the brightness uniformity of the emitted light rays is greatly improved, thereby further optimizing the overall uniformity of the light exit surface.

In an exemplary embodiment, a surface of the light guiding cavity 30 which is close to the light incident surface 12 of the light guiding body and a surface of the light guiding cavity 30 which is close to the light exit surface 11 of the light guiding body are parallel to each other to further optimize the overall uniformity of the light exit surface.

In an exemplary embodiment, geometric parameters of the surface of the light guiding cavity 30 are designed, so that the light rays which are totally reflected by the surface of the light guiding cavity 30 may be deflected to a set area, thereby increasing an amount of light rays entering the area A2 and reducing an amount of light rays entering the area A1, that is, increasing the brightness of the area A2 and reducing the brightness of the area A1. In an exemplary embodiment, the set area may be a middle area between adjacent light emitting diodes 20, or an area where a dark area is formed.

In an exemplary embodiment, a cross-sectional shape of the light guiding cavity 30 along the plane perpendicular to the light exit surface 11 or the light incident surface 12 may include any one or more of S-shape, N-shape, L-shape, Y-shape, and any other types of curved or folded stripe shapes.

In another exemplary embodiment, as shown in FIG. 8, the first light guiding cavity 31 includes a fifth portion 305 disposed between the light incident surface 12 of the light guiding body and the light exit surface 11 of the light guiding body, and fifth portions 305 of different first light guiding cavities 31 may have the same or different shapes. For example, each fifth portion 305 is bent in the direction away from the central plane O of the light guiding cavities 30.

In an exemplary embodiment, each fifth portion 305 has a width d5 of 0.3 mm to 1.5 mm, each fifth portion 305 has a depth which is the same as the depth h of the light guiding structure 10, each fifth portion 305 has a curvature radius of 2 mm to 5 mm, and an angle γ between the fifth portion 305 and the light incident surface 12 may be about 40° to 60° along the plane perpendicular to the light exit surface 11 or the light incident surface 12 of the light guiding body at a junction between the fifth portion 305 and the light incident surface.

In an exemplary embodiment, a distance L5 between two adjacent fifth portions 305 from a group of light guiding cavities 30 along the extending direction of the light incident surface 12 of the light guiding body may be 0.2 mm to 1 mm.

In an exemplary embodiment, a distance L5 between two adjacent fifth portions 305 from a group of light guiding cavities 30 along the extending direction of the light incident surface 12 of the light guiding body varies according to a distance to the light incident surface 12 of the light guiding body. In an exemplary embodiment, the smaller the distance to the light incident surface 12 of the light guiding body, the smaller the distance L5 between the two adjacent fifth portions 305, and the larger the distance to the light incident surface 12 of the light guiding body, the larger the distance L5 between the two adjacent fifth portions 305.

In another exemplary embodiment, as shown in FIG. 8, the second light guiding cavity 32 includes a sixth portion 306 disposed between the light incident surface 12 of the light guiding body and the light exit surface 11 of the light guiding body, and sixth portions 306 of different second light guiding cavities 32 may have the same or different shapes. For example, each sixth portion 306 is bent in the direction away from the central plane O of the light guiding cavity.

In an exemplary embodiment, each sixth portion 306 has a width d6 of 0.3 mm to 1.5 mm, each sixth portion 306 has a depth which is the same as the depth h of the light guiding structure 10, each sixth portion 306 has a curvature radius of 2 mm to 5 mm, and an angle γ' between the sixth portion 306 and the light incident surface 12 may be about 40° to 60° along the plane perpendicular to the light exit surface 11 or the light incident surface 12 of the light guiding body at a junction between the sixth portion 306 and the light incident surface 12.

In an exemplary embodiment, a distance L6 between two adjacent sixth portions 306 from a group of light guiding cavities 30 along the extending direction of the light incident surface 12 of the light guiding body may be 0.2 mm to 1 mm.

In an exemplary embodiment, a distance L6 between two adjacent sixth portions 306 from a group of light guiding cavities 30 along the extending direction of the light incident surface 12 of the light guiding body varies according to a distance to the light incident surface 12 of the light guiding body. In an exemplary embodiment, the smaller the distance to the light incident surface 12 of the light guiding body, the smaller the distance L6 between the two adjacent sixth portions 306, and the larger the distance to the light incident surface 12 of the light guiding body, the larger the distance L6 between the two adjacent sixth portions 306.

Figure 9:
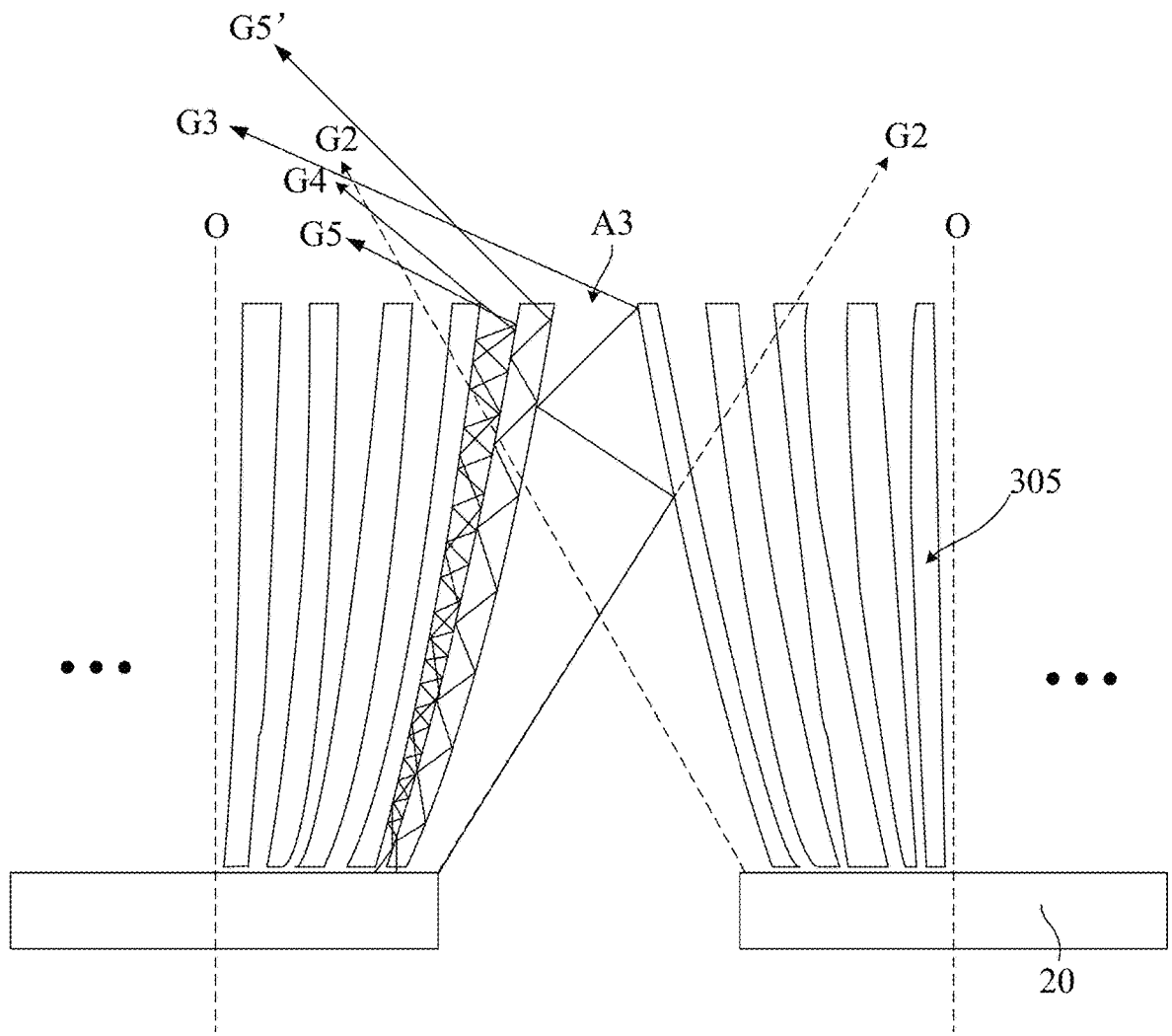
FIG. 9 is a schematic diagram of a light transmission path of the light guiding structure shown in FIG. 8.
Figure 10:
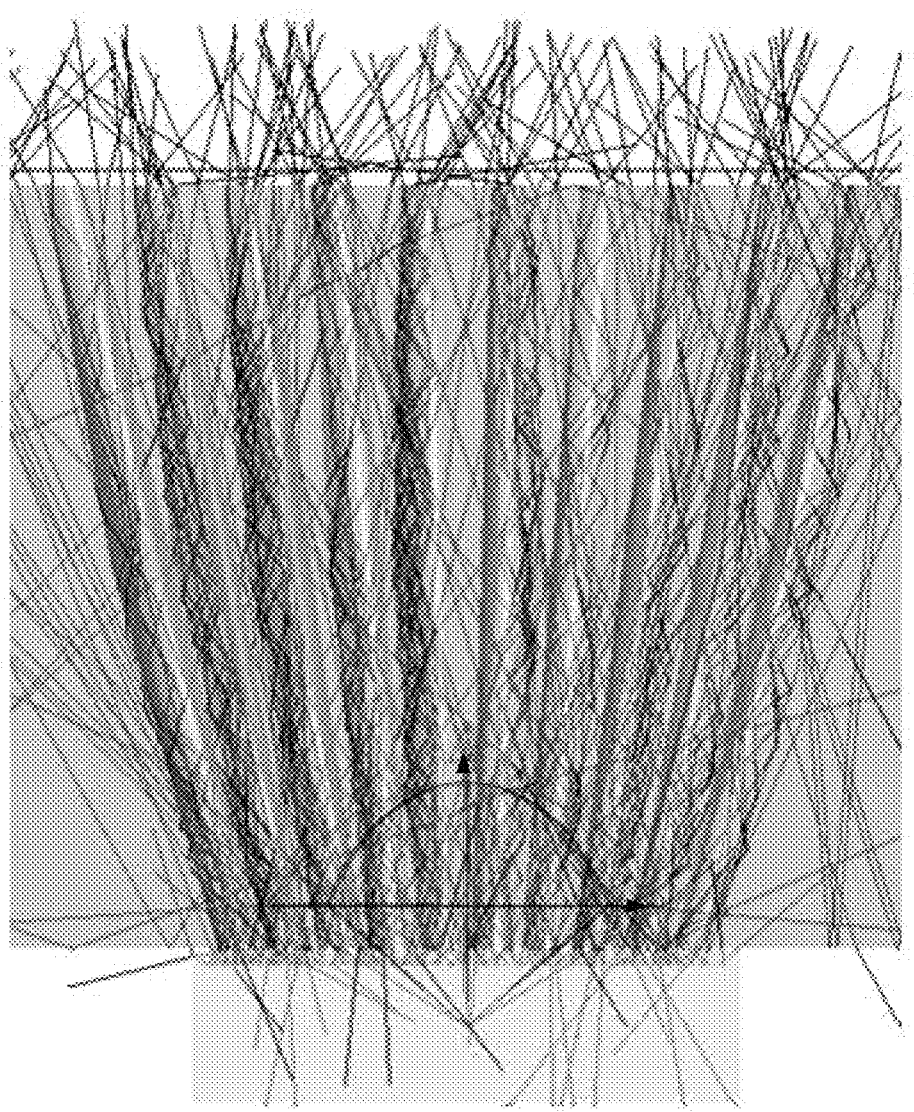
FIG. 10 is a schematic diagram of a simulation effect of light rays of the light guiding structure shown in FIG. 8.

FIG. 9 is a schematic diagram of a light transmission path of the light guiding structure 10 shown in FIG. 8. When the light guiding cavity 30 is not disposed in the light guiding structure 10, light rays emitted from two adjacent light emitting diodes 20 enter the light guiding structure 10 and then propagate in a straight line. As shown by dashed lines G2 in FIG. 9, the light rays G2 propagating in a straight line form a bright area in an area A3 between the adjacent light emitting diodes 20, wherein the area A3 is located in a middle area between the two light emitting diodes 20. According to an embodiment of the present disclosure, by providing the light guiding cavity 30 in the light guiding structure 10, after the light rays emitted from the two adjacent light emitting diodes 20 enter the light guiding structure 10, as shown by solid lines G3, G4, G5 and G5' in FIG. 9, the light rays G3 and G4 are totally reflected by the surface of the light guiding cavity 30 when the light rays G3 and G4 are incident on the surface of the light guiding cavity 30, so that the reflected light rays G3 and G4 are deflected in a direction away from the middle area between the two light emitting diodes 20, the light rays G5 are light rays which are formed by light rays incident into the light guiding cavity 30 being refracted into the light guiding body upon being incident on the surface of the light guiding cavity 30 and then being totally reflected by the surface of the light guiding cavity 30, and the light rays G5' are light rays which are formed by the light rays incident into the light guiding cavity 30 being reflected by the surface of the light guiding cavity 30 upon being incident on the surface of the light guiding cavity 30. As may be seen from FIG. 9, the light guiding cavity 30 is disposed so that an amount of light rays in the area A3 is reduced, so as to avoid the formation of the bright area in the area A3 or reduce the brightness difference between the area A3 and other visible areas. FIG. 10 is a schematic diagram of a simulation effect of actual light rays of the light guiding cavity 30 shown in FIG. 8. Simulation results show that under the condition of a single lamp, the optical uniformity of the light exit surface 11 of the light guiding body may reach more than 80% when the light guiding cavity 30 in FIG. 8 is filled with light guiding resin having a low refractive index. As shown in FIGS. 8 to 10, the light guiding cavity is disposed to an elongated curved strip structure and is filled with materials having a low refractive index, thereby guiding the light rays from the bright area to the dark area, and playing a certain role in shielding and converging the angle of the emitted light rays. In this way, the brightness uniformity of the emitted light rays is greatly improved.

Figure 11:
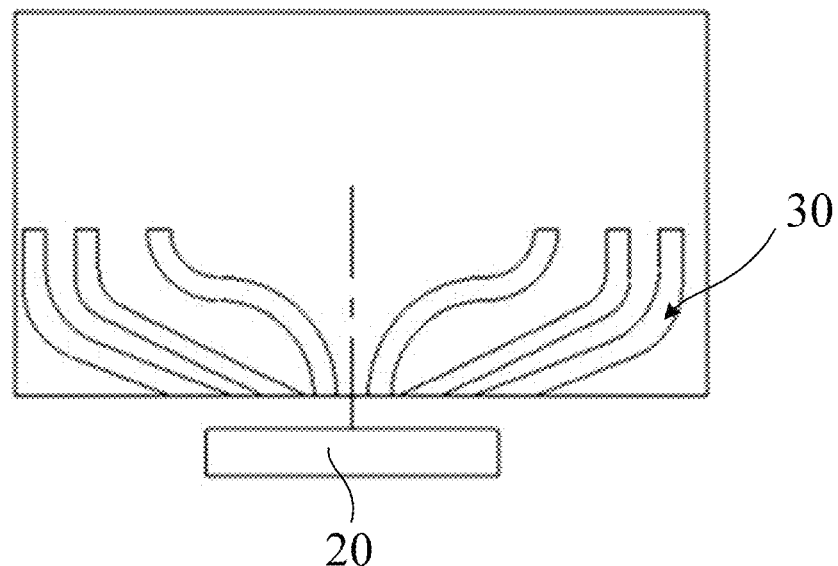
FIG. 11 is a schematic structural sectional view of a further light guiding structure and an adjacent light emitting diode according to an embodiment of the present disclosure.

In another exemplary embodiment, as shown in FIG. 11, the plurality of light guiding cavities 30 may have the same or different cross-sectional shapes along the plane perpendicular to the light exit surface 11 or the light incident surface 12. For example, a part of the light guiding cavities 30 may have an S-shaped cross section and a part of the light guiding cavities 30 may have an L-shaped cross section.

In an exemplary embodiment, in the direction perpendicular to the light exit surface 11 or the light incident surface 12 of the light guiding body, the plurality of light guiding cavities 30 may have the same depth to facilitate processing.

Figure 12:
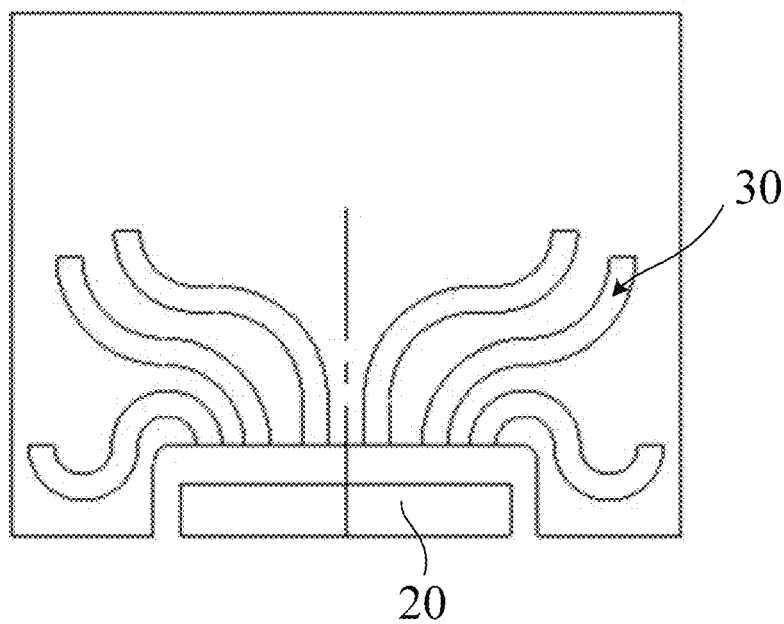
FIG. 12 is a schematic structural sectional view of yet another light guiding structure and an adjacent light emitting diode according to an embodiment of the present disclosure.

In yet another exemplary embodiment, as shown in FIG. 12, when the cross-sectional shapes of the plurality of light guiding cavities 30 are all S-shaped along the plane perpendicular to the light exit surface 11 or the light incident surface 12, the curved strips of the plurality of light guiding cavities 30 may have the same or different bending directions and curvatures.

In an exemplary embodiment, first portions 301 of $1^{st}$ to $j^{th}$ first light guiding cavities are bent in the direction towards the central plane of the light guiding cavities, second portions 302 of the $1^{st}$ to $j^{th}$ first light guiding cavities are bent in the direction away from the central plane of the light guiding cavities, first portions 301 of $(j+1)^{th}$ to $n^{th}$ first light guiding cavities are bent in the direction towards the light incident surface 12 of the light guiding body, and second portions 302 of the $(j+1)^{th}$ to $n^{th}$ first light guiding cavities are bent in the direction away from the light incident surface 12 of the light guiding body, wherein j is a natural number between 1 and n. For example, n is 3 and j is 2.

In an exemplary embodiment, first portions 301 of $1^{st}$ to $j^{th}$ second light guiding cavities are bent in the direction towards the central plane of the light guiding cavities, second portions 302 of the $1^{st}$ to $j^{th}$ second light guiding cavities are bent in the direction away from the central plane of the light guiding cavities, first portions 301 of $(j+1)^{th}$ to $n^{th}$ second light guiding cavities are bent in the direction towards the light incident surface 12 of the light guiding body, and second portions 302 of the $(j+1)^{th}$ to $n^{th}$ second light guiding cavities are bent in the direction away from the light incident surface 12 of the light guiding body, wherein j is a natural number between 1 and n. For example, n is 3 and j is 2.

In an exemplary embodiment, each light guiding cavity 30 may have varied widths at different distances to the light incident surface 12 of the light guiding body.

In an exemplary embodiment, as shown in FIG. 12, at least two light guiding cavities in the same group of light guiding cavities 30 may have different depths.

Figure 13:
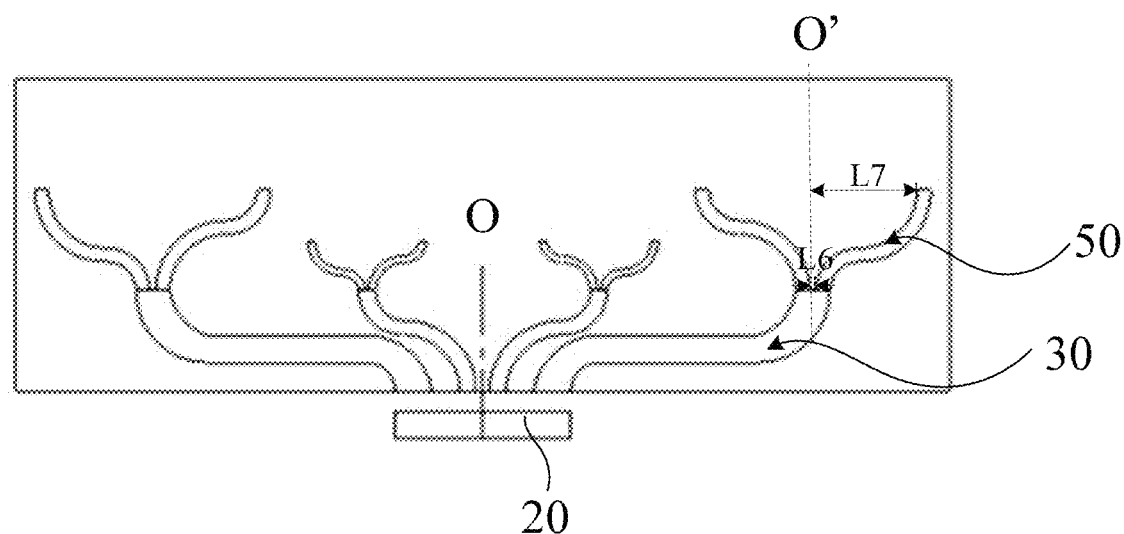
FIG. 13 is a schematic structural sectional view of still another light guiding structure and an adjacent light emitting diode according to an embodiment of the present disclosure.

In an exemplary embodiment, as shown in FIG. 13, at least one of the plurality of light guiding cavities 30 includes a plurality of sub-light guiding cavities 50, which are disposed at the second end of the light guiding cavity 30. The sub-light guiding cavity 50 includes a first end close to the light incident surface 12 of the light guiding body and a second end away from the light incident surface 12 of the light guiding body. The second end of the sub-light guiding cavity 50 includes a second central plane O' located in the light guiding body, which is a virtual plane perpendicular to the light incident surface 12 in the light guiding body. A distance L6 between the first end of the sub-light guiding cavity 50 and the second central plane O' is less than a distance L7 between the second end of the sub-light guiding cavity 50 and the second central plane O'. In this example, the plurality of light guiding cavities 30 and the sub-light guiding cavities 50 form a two-layer tree structure.

In an exemplary embodiment, at least one of the plurality of sub-light guiding cavities 50 may include a plurality of second sub-light guiding cavities, which are disposed at the second end of the sub-light guiding cavity 50. The second sub-light guiding cavity includes a first end close to the light incident surface 12 of the light guiding body and a second end away from the light incident surface 12 of the light guiding body. The second end of the second sub-light guiding cavity includes a third central plane located in the light guiding body, which is a virtual plane perpendicular to the light incident surface 12 in the light guiding body. A distance between the first end of the second sub-light guiding cavity and the third central plane is less than a distance between the second end of the second sub-light guiding cavity and the third central plane. The plurality of light guiding cavities 30, sub-light guiding cavities 50 and second sub-light guiding cavities form a three or more-layer tree structure.

In an exemplary embodiment, the tree structure has at least two layers from the direction close to the light incident surface 12 of the light guiding body to the direction away from the light incident surface 12 of the light guiding body, and a number of light guiding cavities in a structural layer away from the light incident surface 12 of the light guiding body is greater than that in a structural layer close to the light incident surface 12 of the light guiding body, and a width of a light guiding cavity in the structural layer away from the light incident surface 12 of the light guiding body is less than a width of a light guiding cavity in the structural layer close to the light incident surface 12 of the light guiding body.

It may be seen from the light guiding structure according to the embodiment of the present disclosure that in the embodiment of the present disclosure, one or more light guiding cavities 30 are disposed in the light guiding structure 10, so that the light rays in the bright area may be guided to the dark area, thus improving the uniformity of the area light source, improving the optical quality of the light source module and ensuring the quality of the display images. The light source module according to the embodiment of the present disclosure may appropriately reduce a distance between the light emitting diodes 20 and the visible area of the display panel on the premise of reducing the risk of occurrence of dark area between adjacent light emitting diodes 20, thereby reducing a size of the bezel of the light source module, facilitating the realization of narrow bezel and improving the competitiveness of products.

The light guiding structure according to the embodiment of the present disclosure has advantages such as a simple structure, convenient assembly, a simple manufacturing process, a low production cost, etc., and has a good application prospect.

An embodiment of the present disclosure further provides a light source module. In an exemplary embodiment, the light source module includes a light guiding structure 10 and at least one light source disposed on one side close to the light incident surface 12 of the light guiding body. A group of light guiding cavities 30 corresponds to one or more light sources. For example, a group of light guiding cavities 30 is in one-to-one correspondence to a light source.

The light source module according to the embodiment of the present disclosure may realize an area light source with high uniformity with the aid of the light guiding cavity 30 under a condition of ultra-short light mixing distance.

In an exemplary embodiment, the light source may be a light emitting diode 20.

Figure 14:
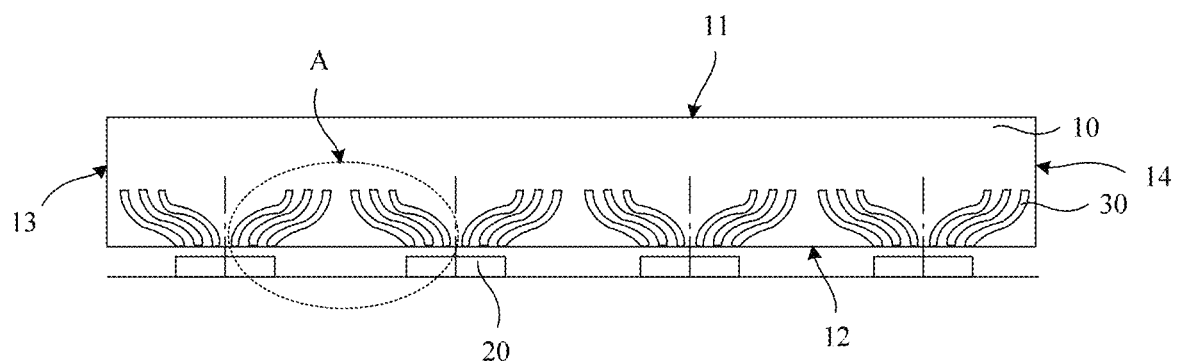
FIG. 14 is a schematic structural sectional view of a light source module according to an embodiment of the present disclosure.

FIG. 14 is a schematic structural diagram of a light source module according to an exemplary embodiment of the present disclosure. As shown in FIG. 14, the light source module may include a light guiding structure 10 and at least one light emitting diode 20, wherein the light guiding structure 10 includes a light guiding body and at least one light guiding cavity 30 disposed in the light guiding body. The light guiding body includes a light incident surface 12 and a light exit surface 11 which are disposed opposite to each other. The light emitting diode 20 is disposed at one end close to the light incident surface 12 of the light guiding body. Each light guiding cavity 30 includes a first end close to the light incident surface 12 of the light guiding body and a second end away from the light incident surface 12 of the light guiding body. The light guiding cavity 30 extends from the first end to the second end.

In an exemplary embodiment, a central plane of each light emitting diode 20 may coincide with a central plane O of a corresponding group of light guiding cavities 30.

In an exemplary embodiment, the light emitting diode 20 has a light exit surface, which is disposed towards the light incident surface 12 of the light guiding body. Light rays emitted by the light emitting diode 20 enter the light guiding body through the light incident surface 12 of the light guiding body.

In an exemplary embodiment, the light exit surface of the light emitting diode 20 and the light incident surface of the light guiding body are parallel to each other, and may have a gap of 0 mm therebetween. In some feasible embodiments, a relative positional relationship between the light exit surface of the light emitting diode 20 and the light incident surface of the light guiding body may be set according to actual situations of a product, which is not limited in the embodiments of the present disclosure here.

In an exemplary embodiment, as shown in FIG. 12, at least one notch recessed towards the light exit surface of the light guiding body is disposed on the light incident surface of the light guiding body, and a light emitting diode 20 adjacent to the notch is disposed in the notch.

In an exemplary embodiment, one notch may accommodate at least one light emitting diode 20 therein.

Figure 15:
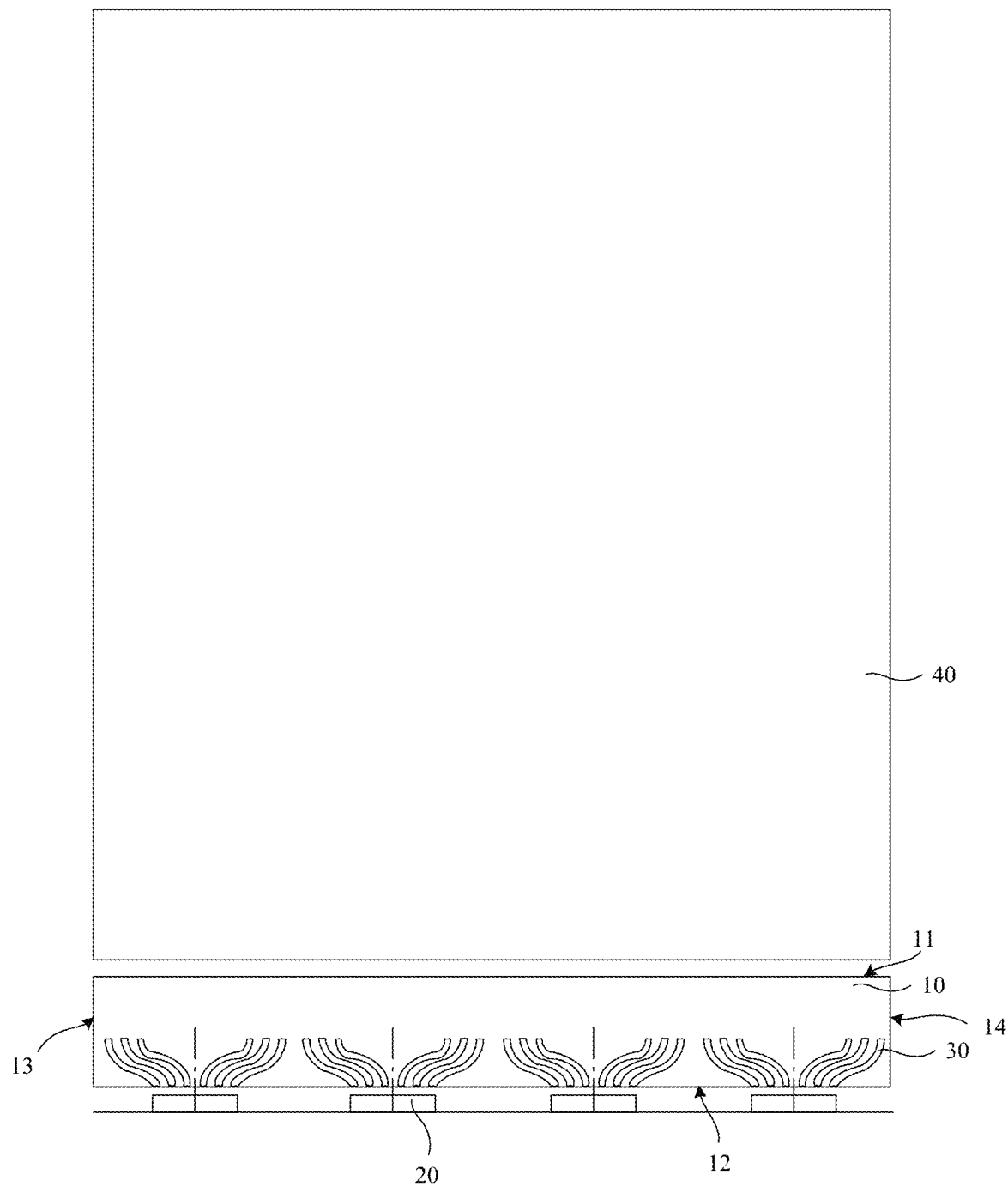
FIG. 15 is a schematic structural sectional view of a display module according to an exemplary embodiment of the present disclosure.

An embodiment of the present disclosure further provides a display module, which includes any one or more light source modules according to the embodiments described above and a display panel 40, as shown in FIG. 15. In an exemplary embodiment, light rays emitted by the light emitting diode 20 are emitted from the light exit surface 11 of the light guiding body and then become an area light source with high uniformity. A surface of the light guiding body facing the display panel 40 is the light exit surface, the uniform light rays emitted from the light exit surface 11 of the light guiding body may enter a side of the display panel 40, and the display panel 40 has a corresponding light extraction structure on the side, which finally converts the light rays on the side into an area light source available for display on the display panel 40.

In an exemplary embodiment, there may be a gap between the display panel 40 and the light guiding structure 10, or the display panel 40 and the light guiding structure 10 may have a gap of 0 mm therebetween.

In an exemplary embodiment, the display module may be a reflective liquid crystal display module.

A reflective display apparatus is capable of utilizing ambient light as an illumination source to display images. Compared with the conventional transmissive display apparatus, the reflective display apparatus has advantages such as soft light rays, power saving, and better display effect in the outdoors, etc., and therefore has attracted more and more attention. With the light guiding structure according to the embodiment of the present disclosure, a uniform area light source may be provided for the reflective display apparatus to assist in display of the display apparatus, so that a better display effect may be achieved even in a weak ambient light or a dark room environment.

In an exemplary embodiment, the display module may be a transparent liquid crystal display module.

Transparent display products are widely applied in exhibition stands, home appliances and special consumer goods. The transparent display products have display effects which are strongly dependent on external light rays, and therefore auxiliary light sources are essential. The conventional backlights are no longer suitable since they have shielding effects for transparent display. As a result, the transparent display products generally adopt side-in auxiliary light sources, wherein one side of a display panel is a light incident side, and a light source module is disposed on the light incident side, so that a uniform area light source is provided for the transparent display products through the light guiding structure according to the embodiment of the present disclosure.

In an exemplary embodiment, the display module may be any other display module which requires a uniform area light source.

The display module may include any one or more of products or components having a display function such as mobile phones, notebook computers, tablet computers, televisions, digital photo frames, vehicle-mounted displays, and navigators, etc. Since the display module includes any of the light source modules described above, the same technical problems may be solved and the same technical effects may be achieved, which will not be described in detail here.

In an exemplary embodiment, the display apparatus may be a transparent display apparatus.

It should be understood that the display apparatus according to the embodiment of the present disclosure is not limited to a transparent display apparatus, and in practical applications, the display apparatus may also be an ordinary opaque display apparatus.

In the description of the embodiments of the present disclosure, it should be understood that, an orientation or positional relationship indicated by terms "middle", "upper", "lower", "front", "rear", "vertical", "horizontal", "top", "bottom", "inside", "outside" and the like is based on the orientation or positional relationship shown in the accompanying drawings, which is only for ease of description of the embodiments of the present disclosure and simplification of the description, rather than indicating or implying that the referred apparatus or element must have a specific orientation, or be constructed and operated in a particular orientation, and therefore which may not be understood as a limitation on the embodiments of the present disclosure.

In the description of embodiments of the present disclosure, it should be illustrated that, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. For those of ordinary skills in the art, the specific meanings of the above terms in the embodiments of the present disclosure may be understood according to specific situations.

Although the implementations disclosed in the embodiments of the present disclosure are described above, the described contents are only the implementations for facilitating understanding of the embodiments of the present disclosure, which are not intended to limit the embodiments of the present disclosure. A person skilled in the art to which the embodiments of the present disclosure pertain may make any modifications and variations in the forms and details of implementation without departing from the spirit and scope of the embodiments of the present disclosure. Nevertheless, the scope of patent protection of the embodiments of the present disclosure shall still be determined by the scope defined by the appended claims.

What is claimed is:

1. A light guiding structure, comprising:
   a light guiding body comprising a light incident surface and a light exit surface which are disposed opposite to each other; and
   at least one light guiding cavity disposed in the light guiding body,
   wherein:
   each of the light guiding cavities comprises a first end close to the light incident surface of the light guiding body and a second end away from the light incident surface of the light guiding body, and the light guiding cavity extends from the first end to the second end;
   there are a plurality of light guiding cavities which are divided into a plurality of groups of light guiding cavities, wherein each group of light guiding cavities comprises a central plane located in the light guiding body, and the group of light guiding cavities comprises n first light guiding cavities located on one side of the central plane and n second light guiding cavities located on the other side of the central plane, where n is a natural number greater than or equal to 1;
   a distance between a first end of a first light guiding cavity and a corresponding central plane is less than a distance between a second end of the first light guiding cavity and the corresponding central plane; and a distance between a first end of a second light guiding cavity and a corresponding central plane is less than a distance between a second end of the second light guiding cavity and the corresponding central plane;
   the central plane is a virtual plane perpendicular to the light incident surface in the light guiding body; and
   the first light guiding cavity comprises a first portion close to the light incident surface of the light guiding body and a second portion away from the light incident surface of the light guiding body, and cross-sectional shapes of the first portion and the second portion along a plane perpendicular to the light exit surface of the light guiding body include any of the followings:
   the cross-sectional shape of the first portion is a curved strip shape, and the cross-sectional shape of the second portion is a curved strip shape;
   the cross-sectional shape of the first portion is a curved strip shape, and the cross-sectional shape of the second portion is a folded strip shape;
   the cross-sectional shape of the first portion is a curved strip shape, and the cross-sectional shape of the second portion is a straight strip shape;
   the cross-sectional shape of the first portion is a folded strip shape, and the cross-sectional shape of the second portion is a curved strip shape; or
   the cross-sectional shape of the first portion is a straight strip shape, and the cross-sectional shape of the second portion is a curved strip shape.

2. The light guiding structure according to claim 1, wherein the light guiding cavity comprises a first medium layer having a refractive index less than that of the light guiding body.

3. The light guiding structure according to claim 2, wherein the first medium layer is a hollowed-out strip-shaped opening on the light guiding body.

4. The light guiding structure according to claim 3, wherein a distance between the second end of the light guiding cavity and the light incident surface of the light guiding body is 1 mm to 3 mm, and a distance between the second end of the light guiding cavity and the light exit surface of the light guiding body is 0.5 mm to 3 mm.

5. The light guiding structure according to claim 2, wherein the first medium layer is a light guiding material filled on the light guiding body.

6. The light guiding structure according to claim 5, wherein the light guiding cavity extends from the light incident surface of the light guiding body to the light exit surface of the light guiding body.

7. The light guiding structure according to claim 1, wherein at least one of a plurality of light guiding cavities comprises a plurality of sub-light guiding cavities which are disposed at the second end of the light guiding cavity;
   a sub-light guiding cavity comprises a first end close to the light incident surface of the light guiding body and a second end away from the light incident surface of the light guiding body, and the second end of the sub-light guiding cavity comprises a second central plane located in the light guiding body, which is a virtual plane perpendicular to the light incident surface in the light guiding body;
   a distance between the first end of the sub-light guiding cavity and the second central plane is less than a distance between the second end of the sub-light guiding cavity and the second central plane; and
   the plurality of light guiding cavities and sub-light guiding cavities form a tree structure.

8. The light guiding structure according to claim 1, wherein an $i^{th}$ first light guiding cavity and an $i^{th}$ second light guiding cavity are disposed in a mirror manner with respect to the central plane of each group of light guiding cavities, where i is a natural number greater than or equal to 1 and less than or equal to n.

9. The light guiding structure according to claim 1, further comprising a first flat surface connected to the light exit surface and the light incident surface respectively, a second flat surface connected to the light exit surface and the light incident surface respectively, a first side surface connected to the light exit surface and the light incident surface respectively, and a second side surface connected to the light exit surface and the light incident surface respectively, wherein the first side surface is disposed opposite to the second side surface, the first flat surface is disposed opposite to the second flat surface; and the first side surface, the second side surface, the first flat surface, and the second flat surface are all provided with reflective sheets.

10. The light guiding structure according to claim 1, wherein the first portion is bent in a direction towards the central plane of the light guiding cavities and the second portion is bent in a direction away from the central plane of the light guiding cavities along the plane perpendicular to the light exit surface of the light guiding body.

11. The light guiding structure according to claim 10, wherein the first portion has a width of 0.2 mm to 1.5 mm, the first portion has a depth of 1 mm to 2 mm, the first portion has a curvature radius of 2 mm to 4.5 mm, and an angle between the first portion and the light incident surface of the light guiding body is 40° to 60° along the plane perpendicular to the light exit surface of the light guiding body at a junction between the first portion and the light incident surface of the light guiding body; and the second portion has a width of 0.2 mm to 1.5 mm, the second portion has a depth of 1 mm to 2 mm, the second portion has a curvature radius of 3.5 mm to 4.5 mm, and an angle between the second portion and the light incident surface of the light guiding body is 40° to 60° along the plane perpendicular to the light exit surface of the light guiding body at a junction between the second portion and the first portion.

12. The light guiding structure according to claim 1, wherein a distance between two adjacent first light guiding cavities from the group of light guiding cavities is 0.2 mm to 1 mm.

13. The light guiding structure according to claim 1, wherein the first light guiding cavity comprises a fifth portion disposed between the light incident surface and the light exit surface of the light guiding body, and all fifth portions are bent in a direction away from the central plane of the light guiding cavities.

14. The light guiding structure according to claim 13, wherein each fifth portion has a width of 0.3 mm to 1.5 mm, each fifth portion has a depth which is the same as that of the light guiding structure, each fifth portion has a curvature radius of 2 mm to 5 mm, and an angle between the fifth portion and the light incident surface of the light guiding body is 40° to 60° along a plane perpendicular to the light exit surface of the light guiding body at a junction between the fifth portion and the light incident surface of the light guiding body.

15. The light guiding structure according to claim 13, wherein a distance between two adjacent fifth portions from the group of light guiding cavities along an extending direction of the light incident surface of the light guiding body is 0.2 mm to 1 mm.

16. A light source module, comprising the light guiding structure according to claim 1, and further comprising at least one light emitting diode having a light exit surface disposed towards the light incident surface of the light guiding body.

17. A display module comprising the light source module according to claim 16 and a display panel.

18. The display module according to claim 17, wherein the display module is a reflective liquid crystal display module or a transparent liquid crystal display module.

* * * * *